United States Patent
Yang et al.

(10) Patent No.: US 8,488,338 B2
(45) Date of Patent: Jul. 16, 2013

(54) CONTROLLER WITH VALLEY SWITCHING AND LIMITED MAXIMUM FREQUENCY FOR QUASI-RESONANT POWER CONVERTERS

(75) Inventors: Ta-Yung Yang, Taoyuan (TW); Jung-Sheng Chen, Fengshan (TW); Li Lin, Taipei (TW)

(73) Assignee: System General Corporation, Sindian, Taipei County (TW)

( * ) Notice: Subject to any disclaimer, the term of this patent is extended or adjusted under 35 U.S.C. 154(b) by 379 days.

(21) Appl. No.: 13/009,639

(22) Filed: Jan. 19, 2011

(65) Prior Publication Data
US 2012/0081084 A1    Apr. 5, 2012

Related U.S. Application Data

(60) Provisional application No. 61/388,812, filed on Oct. 1, 2010.

(51) Int. Cl.
*H02M 3/335* (2006.01)

(52) U.S. Cl.
USPC .......................................... 363/21.02; 363/97

(58) Field of Classification Search
USPC ................................ 363/21.01–21.17, 97, 131
See application file for complete search history.

(56) References Cited

U.S. PATENT DOCUMENTS

| | | | |
|---|---|---|---|
| 6,980,444 B2 * | 12/2005 | Takahashi | 363/21.18 |
| 7,426,120 B2 | 9/2008 | Yang et al. | |
| 8,339,813 B2 * | 12/2012 | Wang et al. | 363/21.02 |
| 2009/0141521 A1 * | 6/2009 | Yang | 363/49 |
| 2009/0175057 A1 * | 7/2009 | Grande et al. | 363/21.15 |

* cited by examiner

*Primary Examiner* — Jessica Han
(74) *Attorney, Agent, or Firm* — McClure, Qualey & Rodack, LLP

(57) ABSTRACT

A controller for a power converter is provided. The controller includes a PWM circuit, a detection circuit, a signal generation circuit and an oscillation circuit. The PWM circuit generates a switching signal coupled to switch a transformer of the power converter. A feedback signal is coupled to the PWM circuit to disable the switching signal. The detection circuit is coupled to the transformer via a resistor for generating a valley signal in response to a signal waveform of the transformer. The signal generation circuit is coupled to receive the feedback signal and the valley signal for generating an enabling signal. The oscillation circuit generates a maximum frequency signal. The maximum frequency signal associates with the enabling signal to generate a pulse signal. The feedback signal is correlated to an output load of the power converter. The maximum frequency of the pulse signal is limited.

15 Claims, 7 Drawing Sheets

US 8,488,338 B2

CONTROLLER WITH VALLEY SWITCHING AND LIMITED MAXIMUM FREQUENCY FOR QUASI-RESONANT POWER CONVERTERS

CROSS REFERENCE TO RELATED APPLICATIONS

This application claims the benefit of U.S. Provisional Application No. 61/388,812, filed on Oct. 1, 2010, the contents of which are incorporated herein by reference.

BACKGROUND OF THE INVENTION

1. Field of the Invention

The present invention generally relates to power converters; more specifically, the present invention relates to quasi-resonant power converters.

2. Description of the Related Art

To improve efficiency and reduce power loss at high switching frequency, a quasi-resonant power converter is a solution. The technical details of quasi-resonant power converter can be found in the prior art "Switching Control Circuit Having a Valley Voltage Detector to Achieve Soft Switching for a Resonant Power converter", U.S. Pat. No. 7,426,120. However, the drawback of the quasi-resonant power converter is lower efficiency under light-load conditions. A switching frequency of the quasi-resonant power converter is varied in response to an input voltage and an output load thereof. Once the input voltage increases or the output load decreases, the switching frequency of the quasi-resonant power converter will inherently increase. The increased switching frequency under light-load conditions will increase the switching loss of the quasi-resonant power converter and therefore reduces the efficiency.

BRIEF SUMMARY OF THE INVENTION

The present invention provides a controller for a power converter. The controller comprises a PWM circuit, a detection circuit, a signal generation circuit and an oscillation circuit. The PWM circuit generates a switching signal coupled to switch a transformer of the power converter. A feedback signal is coupled to the PWM circuit to disable the switching signal. The detection circuit is coupled to the transformer via a resistor for generating a valley signal in response to a signal waveform of the transformer. The signal generation circuit is coupled to receive the feedback signal and the valley signal for generating an enabling signal. The oscillation circuit generates a maximum frequency signal. The maximum frequency signal associates with the enabling signal to generate a pulse signal. The pulse signal is coupled to enable the switching signal. The feedback signal is correlated to an output load of the power converter. The maximum frequency of the pulse signal is limited.

The controller further comprises a burst circuit coupled to receive the feedback signal for generating a burst signal to disable the switching signal. The burst circuit includes a threshold with a hysteresis characteristic for generating the burst signal. An off-time of the switching signal increases in response to a decrement of the feedback signal.

The detection circuit comprises a detection terminal, a voltage clamping circuit, a current detection circuit and a comparator. The detection terminal is coupled to the transformer to detect the signal waveform of the transformer. The voltage clamping circuit clamps a minimum voltage at the detection terminal. The current detection circuit generates a current signal in response to a current sourcing to the detection terminal. The comparator generates the valley signal in response to the current signal. The valley signal is generated only when the switching signal is disabled.

The present invention also provides a method for controlling a quasi-resonant power converter, comprising: generating a switching signal coupled to switch a transformer of the quasi-resonant power converter; generating a reset signal in response to a feedback signal; generating a valley signal in response to a signal waveform of the transformer during an off-time of the switching signal; generating a maximum frequency signal; generating an enabling signal in response to the feedback signal and the valley signal; and generating a pulse signal in response to the enabling signal and the maximum frequency signal, wherein the reset signal is coupled to disable switching signal, the pulse signal is coupled to enable the switching signal, the feedback signal is correlated to an output load of the quasi-resonant power converter.

The valley signal is generated via a resistor coupled to the transformer. The method further comprises generating a burst signal in response to the feedback signal, the burst signal is coupled to disable the switching signal, wherein the burst signal is generated in response to the feedback signal and a threshold signal, the threshold signal has a hysteresis characteristic for generating the burst signal. The off-time of the switching signal increases in response to a decrement of the feedback signal. A maximum frequency of the switching signal is limited.

The present invention also provides a method for switching a power converter. The method comprises: generating a switching signal coupled to switch a transformer of the power converter; generating a reset signal in response to a feedback signal; generating a valley signal in response to a signal waveform of the transformer during an off-time of the switching signal; and generating a pulse signal in response to the feedback signal and the valley signal, wherein a maximum frequency of the pulse signal is limited, the reset signal is coupled to disable the switching signal, the pulse signal is coupled to enable the switching signal; the feedback signal is correlated to an output load of the power converter. The method further comprises: generating a maximum frequency signal to generate the pulse signal, wherein a frequency of the maximum frequency signal decreases in response to a decrement of the feedback signal. The valley signal is generated via a resistor coupled to the transformer. The method further comprises: generating a burst signal in response to the feedback signal, wherein the burst signal is coupled to disable the switching signal; wherein the burst signal is generated in response to the feedback signal and a threshold signal, the threshold signal has a hysteresis characteristic for generating the burst signal. An off-time of the switching signal increases in response to a decrement of the feedback signal. A maximum frequency of the switching signal is limited.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
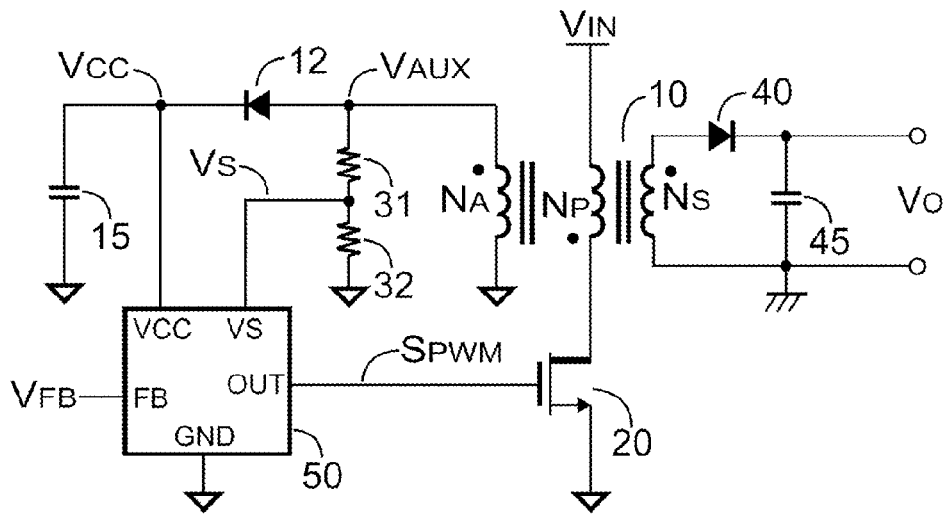
FIG. 1 shows a quasi-resonant power converter.

FIG. 1 shows a quasi-resonant power converter. A transformer 10 has a primary winding $N_P$, an auxiliary winding $N_A$ and a secondary winding $N_S$. The primary winding $N_P$ is coupled to an input voltage $V_{IN}$. The secondary winding $N_S$ generates an output voltage $V_O$ via a rectifier 40 and a capacitor 45. In order to regulate the output voltage $V_O$, a controller 50 generates a switching signal $S_{PWM}$ to switch the transformer 10 via a transistor 20. A feedback signal $V_{FB}$ is correlated to the output voltage $V_O$ of the quasi-resonant power converter. In one embodiment of the present invention, the feedback voltage $V_{FB}$ varies in proportion to the output load of the quasi-resonant power converter. The feedback signal $V_{FB}$ is coupled to the controller 50 to generate the switching signal $S_{PWM}$ for regulating the output voltage $V_O$ of the quasi-resonant power converter. A reflected voltage $V_{AUX}$ of the auxiliary winding $N_A$ of the transformer 10 can be expressed as, $$V_{AUX} = \frac{N_a}{N_s} \times V_o \quad (1)$$

where $N_a$ and $N_s$ are respectively the winding turns of the auxiliary winding $N_A$ and the secondary winding $N_S$ of the transformer 10.

A voltage divider formed by resistors 31 and 32 is connected to a detection terminal VS of the controller 50 to detect the waveform of the reflected voltage $V_{AUX}$ of the auxiliary winding $N_A$ of the transformer 10. A detection voltage $V_S$ received at the detection terminal VS of the controller 50 is attenuated from the reflected voltage, which can be shown as, $$V_S = \frac{R_{32}}{R_{31} + R_{32}} \times V_{AUX} \quad (2)$$

where $R_{31}$ and $R_{32}$ are respectively the resistance of resistors 31 and 32.

The detection voltage $V_S$ is also related to a demagnetizing time $T_S$ (shown in FIGS. 10A and 10B) of the transformer 10 and a drain-to-source voltage ($V_{DS}$) of the transistor 20. Therefore, the switching signal $S_{PWM}$ is generated in response to the detection voltage $V_S$ to achieve valley switching operation.

Figure 2:
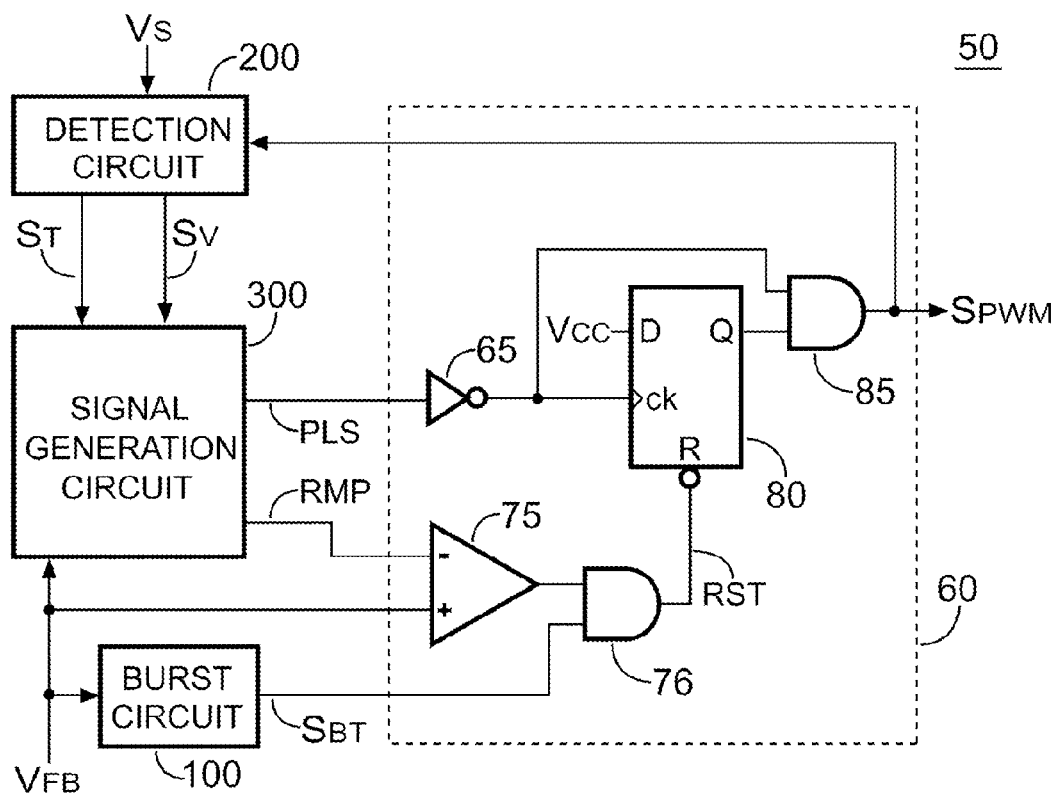
FIG. 2 shows an embodiment of a controller of the quasi-resonant power converter according to the present invention.

FIG. 2 shows an embodiment of the controller 50 of the quasi-resonant power converter according to the present invention. The controller 50 comprises a PWM (pulse width modulation) circuit 60, a detection circuit 200, a signal generation circuit 300 and a burst circuit 100. The PWM circuit 60 generates the switching signal $S_{PWM}$ coupled to switch the transformer 10 via the transistor 20. The PWM circuit 60 comprises a flip-flop 80, an AND gate 85, an inverter 65, an AND gate 76 and a comparator 75. The feedback signal $V_{FB}$ is supplied to the burst circuit 100 to generate a burst signal $S_{BT}$ for disabling the switching signal $S_{PWM}$ when the level of the feedback signal $V_{FB}$ drops to a specific level. The signal generation circuit 300 generates a pulse signal PLS and a ramp signal RMP. The comparator 75 compares the ramp signal RMP and the feedback signal $V_{FB}$. An output of the comparator 75 and the burst signal $S_{BT}$ are supplied to inputs of the AND gate 76 for generating a reset signal RST at an output of the AND gate 76. The reset signal RST is utilized to disable the switching signal $S_{PWM}$. The detection circuit 200 is coupled to the transformer 10 via the detection terminal VS for generating a valley signal $S_V$ and a discharge-time signal $S_T$ in response to the waveform of the auxiliary winding $N_A$ of the transformer 10. The signal generation circuit 300 is coupled to receive the feedback signal $V_{FB}$, the valley signal $S_V$ and the discharge-time signal $S_T$ for generating the pulse signal PLS. The pulse signal PLS is coupled to enable the switching signal $S_{PWM}$ by clocking the flip-flop 80 via the inverter 65. The output of the flip-flop 80 is connected to an input of the AND gate 85 for generating the switching signal $S_{PWM}$. Another input of the AND gate 85 receives the reversed pulse signal PLS via the inverter 65 to limit a maximum duty of the switching signal $S_{PWM}$.

Figure 3:
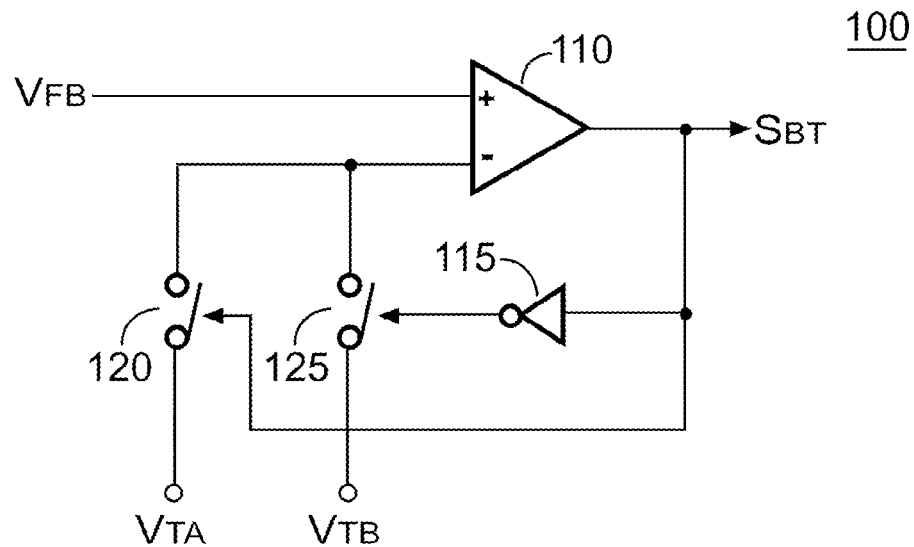
FIG. 3 shows an embodiment of a burst circuit of the controller according to the present invention.

FIG. 3 shows an embodiment of the burst circuit 100 of the controller 50 according to the present invention. The burst circuit 100 comprises a comparator 110 and a hysteresis circuit. A positive terminal of the comparator 110 receives the feedback signal $V_{FB}$. A negative terminal of the comparator 110 receives a threshold signal. The hysteresis circuit comprises an inverter 115 and switches 120 and 125. A first terminal of the switch 120 and a first terminal of the switch 125 are respectively supplied with a reference voltage $V_{TA}$ and a reference voltage $V_{TB}$. A second terminal of the switch 120 and a second terminal of the switch 125 are connected to the negative terminal of the comparator 110. A control terminal of the switch 120 is controlled by the burst signal $S_{BT}$. A control terminal of the switch 125 is controlled by the reversed burst signal $S_{BT}$ via the inverter 115. Once the switch 120 is turned on when the burst signal $S_{BT}$ is enabled, the threshold signal will be switched to a level of the reference voltage $V_{TA}$. Once the switch 125 is turned on when the burst signal $S_{BT}$ is disabled, the threshold signal will be switched to a level of the reference voltage $V_{TB}$. The level of the reference voltage $V_{TA}$ is the aforementioned specific level, which is lower than that of the reference voltage $V_{TB}$. The reference voltages $V_{TA}$ and $V_{TB}$ provide the threshold signal a hysteresis characteristic for generating the burst signal $S_{BT}$.

Figure 4:
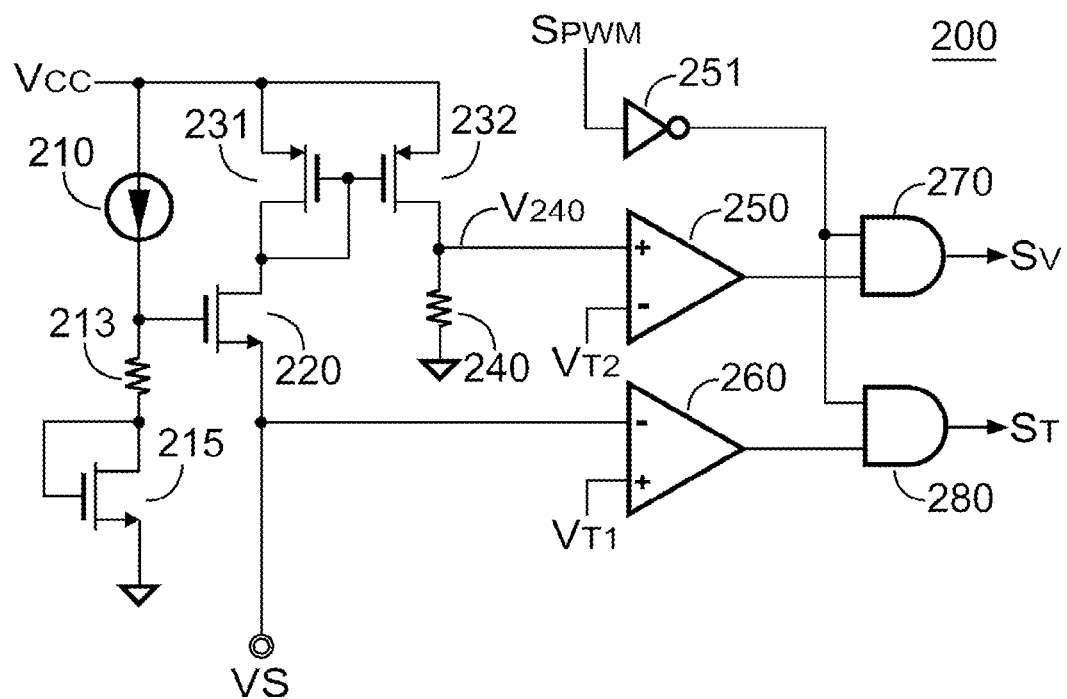
FIG. 4 shows an embodiment of a detection circuit of the controller according to the present invention.

FIG. 4 shows an embodiment of the detection circuit 200 of the controller 50 according to the present invention. The detection circuit 200 comprises a voltage clamping circuit, a current detection circuit and a signal generator. The voltage clamping circuit comprises a current source 210, a resistor 213, a transistor 215 and a transistor 220. The current source 210 is connected between a supply voltage $V_{CC}$ and a gate of the transistor 220. The resistor 213 is connected between the gate of the transistor 220 and a drain of the transistor 215. A gate and the drain of the transistor 215 are connected together. A source of the transistor 215 is connected to a ground reference. A source of the transistor 220 is connected to the detection terminal VS. The detection terminal VS is coupled to the transformer 10 via the voltage divider to receive the detection signal $V_S$. The voltage clamping circuit clamps a minimum magnitude ($V_{S(MIN)}$) of the detection voltage $V_S$. A turn-on threshold voltage of the transistor 215 is correlated to that of the transistor 220. A current of the current source 210 and the resistance of the resistor 213 determine the minimum magnitude ($V_{S(MIN)}$) of the detection voltage $V_S$ at the detection terminal VS. The minimum magnitude ($V_{S(MIN)}$) of the detection voltage $V_S$ can be expressed as:

$$V_{S(MIN)} = -\left(V_{in} \times \frac{N_a}{N_p} \times \frac{R_{32}}{R_{31} + R_{32}}\right) \quad (3)$$

where $V_{in}$ is the input voltage of the quasi-resonant power converter.

The current detection circuit comprises transistors 231, 232 and a resistor 240. The transistors 231 and 232 form a current mirror. An input of the current mirror is connected to a drain of the transistor 220. The resistor 240 is connected to an output of the current mirror. The current detection circuit generates a current signal $V_{240}$ across the resistor 240 in response to a current sourced to the detection terminal VS. The signal generator comprises comparators 250, 260, an inverter 251 and AND gates 270, 280. A positive terminal of the comparator 250 receives the current signal $V_{240}$. A negative terminal of the comparator 250 is supplied with a threshold voltage $V_{T2}$. A negative terminal of the comparator 260 is connected to the detection terminal VS. A positive terminal of the comparator 260 is supplied with a threshold voltage $V_{T1}$. A first input of the AND gate 270 and a first input of the AND gate 280 are supplied with the reversed switching signal $S_{PWM}$ via the inverter 251. A second input of the AND gate 270 and a second input of the AND gate 280 are respectively connected to an output of the comparator 250 and an output of the comparator 260. An output of the AND gate 270 generates the valley signal $S_V$ in response to this current signal $V_{240}$. When the current signal $V_{240}$ is higher than the threshold signal $V_{T2}$ and the switching signal $S_{PWM}$ is being disabled, the valley signal $S_V$ will be enabled. When the detection voltage $V_S$ at the detection terminal VS is lower than the threshold voltage $V_{T1}$ and the switching signal $S_{PWM}$ is being disabled, the discharge-time signal $S_T$ will be enabled. The discharge-time signal $S_T$ indicating a demagnetized time of the transformer 10 is utilized to achieve the quasi-resonant switching for the power converter.

Figure 5:
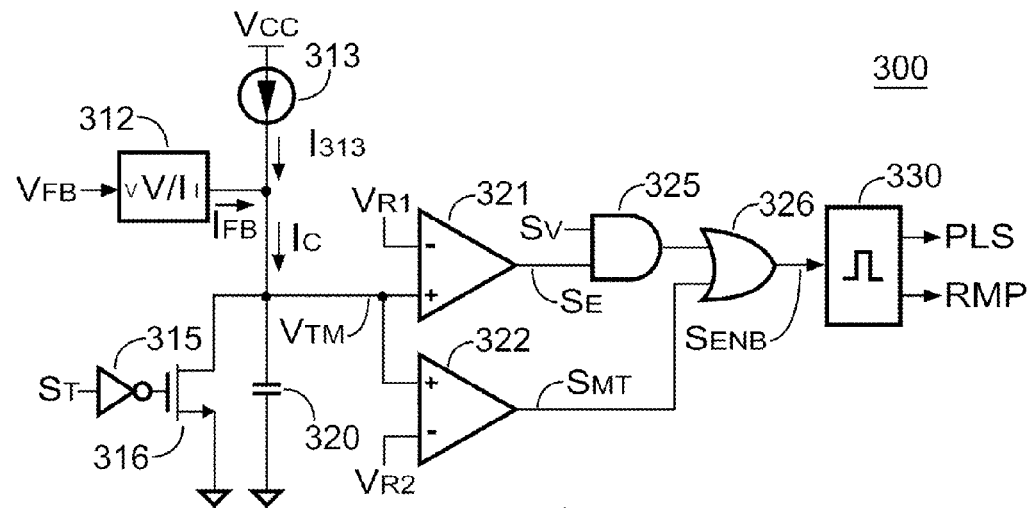
FIG. 5 shows an embodiment of a signal generation circuit of the controller according to the present invention.

FIG. 5 shows an embodiment of the signal generation circuit 300 of the controller 50 according to the present invention. The signal generation circuit 300 comprises a timing circuit, an enabling circuit and an oscillation circuit 330. The timing circuit comprises a voltage-to-current converter 312, a current source 313, an inverter 315, a transistor 316 and a capacitor 320. An input of the voltage-to-current converter 312 receives the feedback signal $V_{FB}$. The current source 313 is connected between the supply voltage $V_{CC}$ and an output of the voltage-to-current converter 312. The capacitor 320 is connected between the output of the voltage-to-current converter 312 and the ground reference. The transistor 316 is connected in parallel with the capacitor 320. A gate of the transistor 316 is controlled by the reversed discharge-time signal $S_T$ via the inverter 315. The discharge-time signal $S_T$ is coupled to discharge the capacitor 320 via the inverter 315 and the transistor 316. The voltage-to-current converter 312 converts the feedback signal $V_{FB}$ into a current $I_{FB}$. The current source 313 provides a current $I_{313}$. A magnitude of a charge current $I_C$ to the capacitor 320 is equal to the sum of the current $I_{313}$ and the current $I_{FB}$. The charge current $I_C$ charges the capacitor 320 to generate a timing signal $V_{TM}$ across the capacitor 320. The current $I_{313}$ also ensures a minimum magnitude of the charge current $I_C$. The charge current $I_C$ is thus decreased as the feedback signal $V_{FB}$ decreases. Therefore, the charge time of the timing signal $V_{TM}$ increases as the feedback signal $V_{FB}$ decreases. The enabling circuit comprises comparators 321, 322, an AND gate 325 and an OR gate 326. The comparator 321 compares the timing signal $V_{TM}$ with a reference voltage $V_{R1}$ for enabling a first enabling signal $S_E$ when the timing signal $V_{TM}$ is higher than the reference voltage $V_{R1}$. The first enabling signal $S_E$ and the valley signal $S_V$ are supplied to inputs of the AND gate 325. A period starting as the discharge-time signal $S_T$ is enabled and ending as the first enabling signal $S_E$ is enabled is defined as an enabling delay time. The feedback signal $V_{FB}$ decreases in response to a decrement of the output load. The enabling delay time increases in response to a decrement of the feedback signal $V_{FB}$. The off-time of the switching signal $S_{PWM}$ is therefore increased in response to the decrement of the feedback signal $V_{FB}$. The comparator 322 compares the timing signal $V_{TM}$ with a reference voltage $V_{R2}$ for enabling a time-out signal $S_{MT}$ when the timing signal $V_{TM}$ is higher than the reference voltage $V_{R2}$. An output of the AND gate 325 and the time-out signal $S_{MT}$ are supplied to inputs of the OR gate 326 for generating an enabling signal $S_{ENB}$. The reference voltage $V_{R2}$ is higher than the reference voltage $V_{R1}$. The oscillation circuit 330 receives the enabling signal $S_{ENB}$ for generating the pulse signal PLS and the ramp signal RMP.

Figure 6:
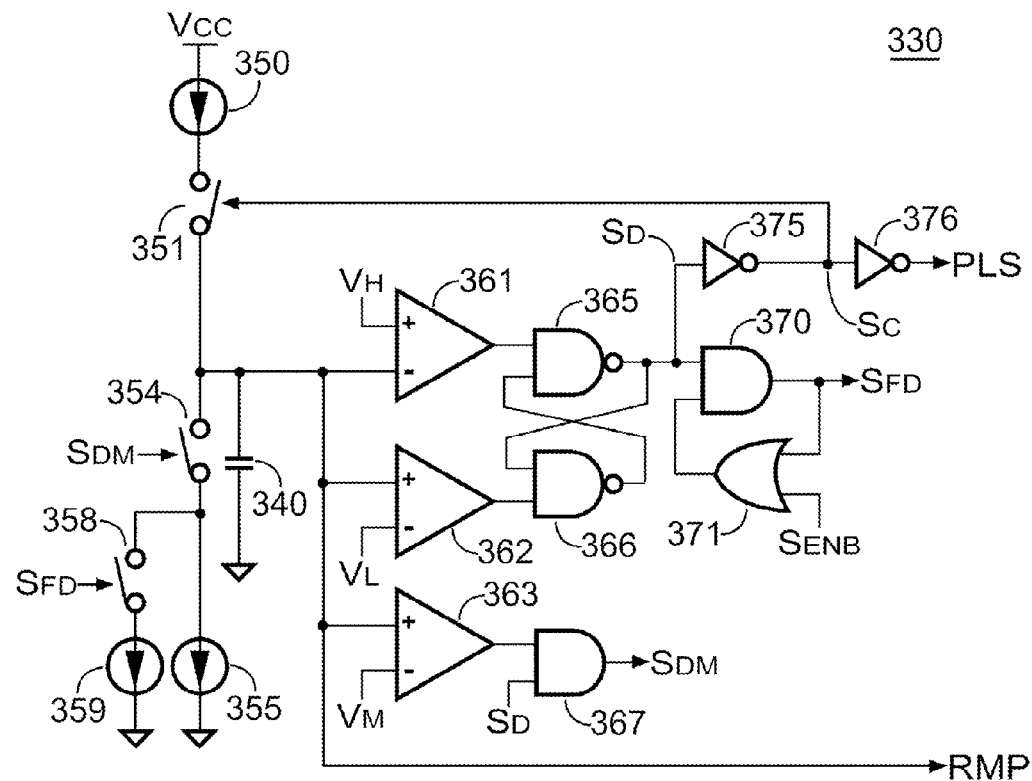
FIG. 6 shows an embodiment of an oscillation circuit of the signal generation circuit according to the present invention.

FIG. 6 shows an embodiment of the oscillation circuit 330 of the signal generation circuit 300 according to the present invention. The oscillation circuit 330 comprises a saw-tooth generator and a control circuit. The saw-tooth generator comprises current sources 350, 355, 359, a capacitor 340 and switches 351, 354, 358. The current source 350 is connected between the supply voltage $V_{CC}$ and a first terminal of the switch 351. A second terminal of the switch 351 is connected to a first terminal of the switch 354. The current source 355 is connected between a second terminal of the switch 354 and the ground reference. The switch 358 and the current source 359 are connected in series between the second terminal of the switch 354 and the ground reference. The capacitor 340 is connected between the second terminal of the switch 351 and the ground reference. The current source 350 is utilized to charge the capacitor 340 via the switch 351. The current source 355 is utilized to discharge the capacitor 340 via the switch 354. The ramp signal RMP is therefore generated across the capacitor 340. The switch 351 is controlled by a charge signal $S_C$. The switch 354 is controlled by a discharge signal $S_{DM}$. The switch 358 is controlled by a fast-discharge signal $S_{FD}$. The ramp signal RMP is thus generated across the capacitor 340. The control circuit comprises comparators 361, 362, 363, NAND gates 365, 366, AND gates 367, 370, inverters 375, 376 and an OR gate 371. The ramp signal RMP is supplied to a negative terminal of the comparator 361, a positive terminal of the comparator 362 and a positive terminal of the comparator 363. A positive terminal of the comparator 361 receives a threshold voltage $V_H$. A negative terminal of the comparator 362 receives a threshold voltage $V_L$.

A negative terminal of the comparator 363 receives a threshold voltage $V_M$. The threshold voltage $V_H$ is greater than the threshold voltage $V_M$. The threshold voltage $V_M$ is greater than the threshold voltage $V_L$. NAND gates 365 and 366 form a latch circuit coupled to receive the output signals of the comparators 361 and 362. The latch circuit outputs a discharge signal $S_D$. The discharge signal $S_D$ determines a maximum frequency of the switching signal $S_{PWM}$. The discharge signal $S_D$ and an output signal of the comparator 363 are supplied to inputs of the AND gate 367 for generating the discharge signal $S_{DM}$. The inverter 375 receives the discharge signal $S_D$ to generate the charge signal $S_C$. The inverter 376 receives the charge signal $S_C$ to generate the pulse signal PLS. The pulse signal PLS is enabled during a discharge period of the capacitor 340. The discharge signal $S_D$ is further supplied to an input of the AND gate 370 to generate the fast-discharge signal $S_{FD}$. The fast-discharge signal $S_{FD}$ and the enabling signal $S_{ENB}$ are supplied to inputs of the OR gate 371. An output of the OR gate 371 is connected to another input of the AND gate 370. Therefore, the enabling signal $S_{ENB}$ will trigger the fast-discharge signal $S_{FD}$ once the discharge signal $S_D$ is enabled. The fast-discharge signal $S_{FD}$ can be disabled only when the discharge signal $S_D$ is disabled. Since the current of the current source 359 is much higher than that of the current source 355, the capacitor 340 will be immediately discharged when the fast-discharge signal $S_{FD}$ is enabled. During the discharge period of the capacitor 340, the ramp signal RMP is held at the level of the threshold voltage $V_M$ until the enable signal $S_{ENB}$ starts the fast-discharge signal $S_{FD}$. Once the ramp signal RMP is lower than the threshold voltage $V_L$, the discharge signal $S_D$ will be disabled. The valley signal $S_V$ is thus able to trigger the pulse signal PLS once the discharge signal $S_D$ is enabled. Therefore, the current of the current source 350, the capacitance of the capacitor 340 and the threshold voltages $V_H$, $V_M$, $V_L$ determine a maximum frequency of the discharge signal $S_D$, which also determines the maximum frequency of the switching signal $S_{PWM}$.

Figure 7:
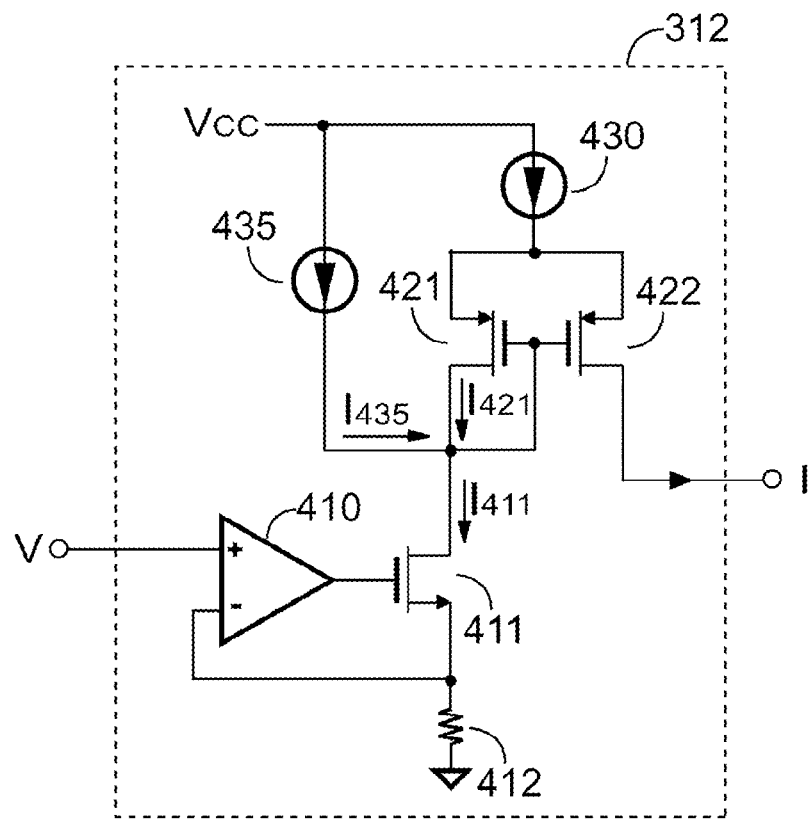
FIG. 7 shows a schematic of a Voltage-to-current converter of the signal generation circuit according to the present invention.

FIG. 7 shows a schematic of the voltage-to-current converter 312 of the signal generation circuit 300 according to the present invention. The voltage-to-current converter 312 comprises current sources 430, 435, an operational amplifier 410, transistors 411, 421, 422 and a resistor 412. An input terminal V is connected to a positive terminal of the operational amplifier 410. An output terminal of the operational amplifier 410 is coupled to drive the transistor 411. A negative terminal of the operational amplifier 410 is connected to a source of the transistor 411. The resistor 412 is connected between the source of the transistor 411 and the ground reference. The current source 435 is connected between the supply voltage $V_{CC}$ and a drain of the transistor 411. A current $I_{411}$ flowing through the transistor 411 will flow through the resistor 412. Once the current $I_{411}$ is higher than a current $I_{435}$ sourced from the current source 435, a current $I_{421}$, which equals to the difference of the current $I_{411}$ and the current $I_{435}$, will flow via an input of the current mirror developed by transistors 421 and 422. A current generated at the terminal I, which is also an output of the current mirror, will be in proportion to the current $I_{421}$. A maximum current generated at the terminal I will be limited by the current source 430. The transistor 422 generates an output current at an output terminal I, which is corrected to an input voltage at the input terminal V.

Figure 8:
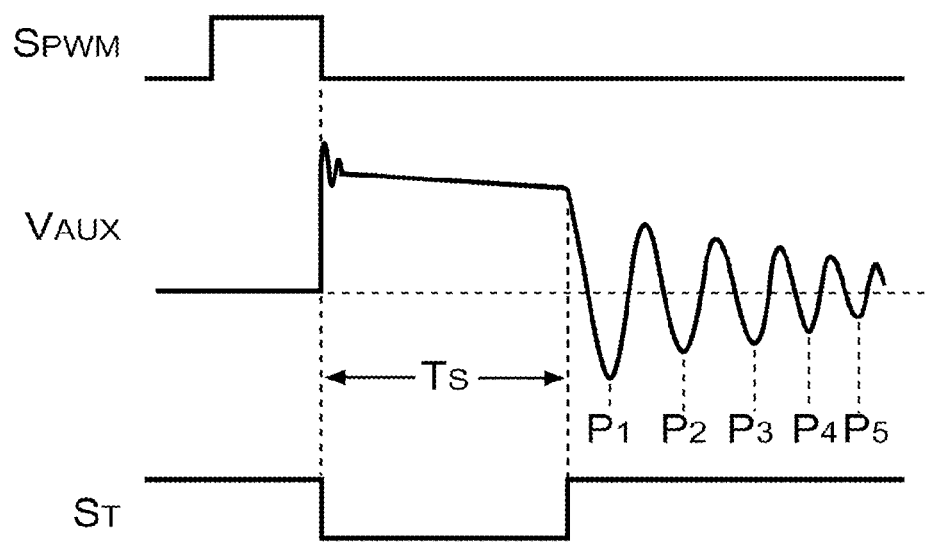
FIG. 8 shows waveforms of a switching signal and a reflected voltage of a transformer of the present invention.

FIG. 8 shows waveforms of the switching signal $S_{PWM}$ and the reflected voltage $V_{AUX}$ of the transformer 10. The period $T_S$ represents the demagnetizing time of the transformer 10, which is correlated to the discharge-time signal $S_T$. To achieve quasi-resonant operation, the switching signal $S_{PWM}$ could be enabled at time point $P_1$, $P_2$, or $P_5$, depending on the load conditions. As the load is heavier, the switching signal $S_{PWM}$ could be enabled at the time point $P_1$ or $P_2$. As the load is lighter, the switching signal $S_{PWM}$ could be enabled at the time point $P_3$, $P_4$, or $P_5$.

Figure 9:
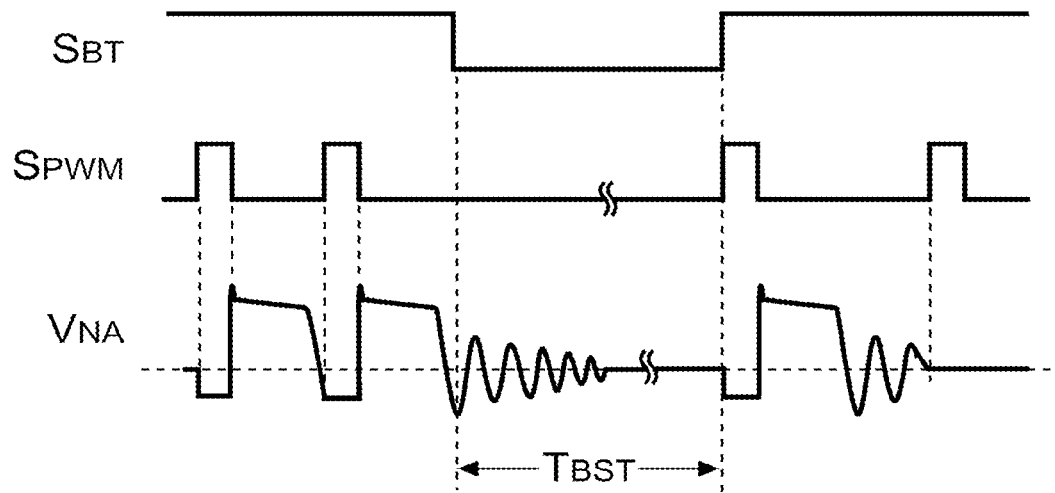
FIG. 9 shows key waveforms of the quasi-resonant power converter operated at burst mode.

FIG. 9 shows key waveforms of the quasi-resonant power converter operated under various load condition. In a shown burst period $T_{BST}$, the quasi-resonant power converter is operated at burst mode. The burst mode indicates that the operation of the quasi-resonant power converter has entered ultra-light-load condition. Once the burst signal $S_{BT}$ is activated (disabled), the switching signal $S_{PWM}$ will be disabled. That is, when the switching signal $S_{PWM}$ is not disabled by the burst signal $S_{BT}$, the switching signal $S_{PWM}$ could be enabled at time point $P_1$ or $P_2$ for reducing the switching loss of the transistor 20, which increases the efficiency of the quasi-resonant power converter.

Figure 10A:
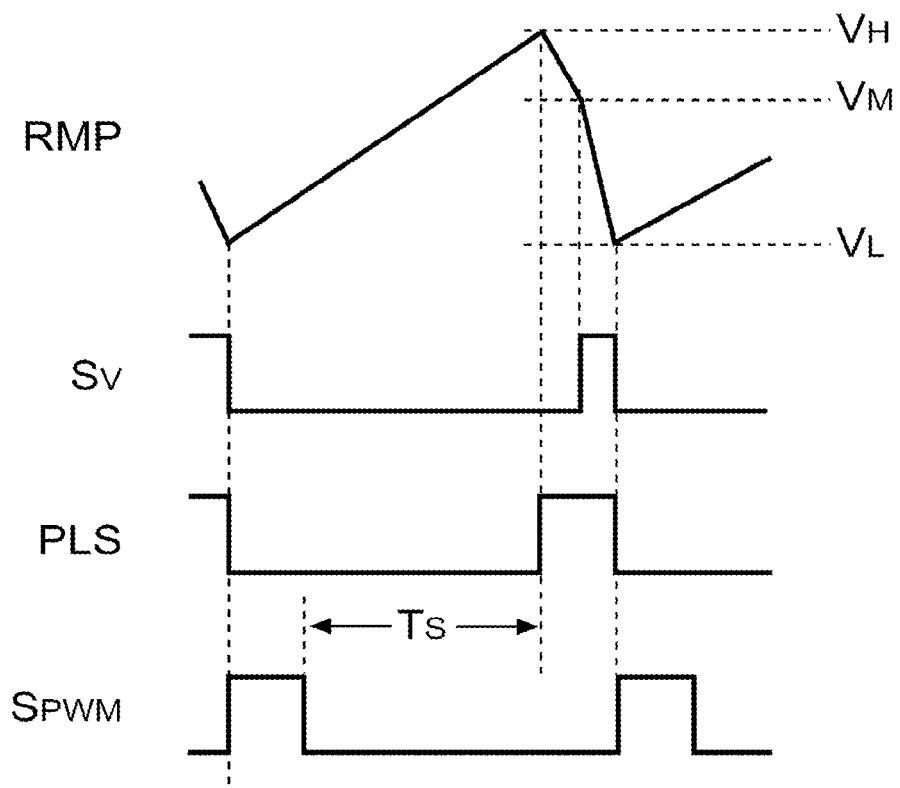
FIG. 10A shows key waveforms of the quasi-resonant power converter under heavy load condition.

FIG. 10A shows key waveforms as the quasi-resonant power converter is operated at quasi-resonant and valley switching under heavy load condition. The switching signal $S_{PWM}$ is enabled at the time point $P_1$ shown in FIG. 8.

Figure 10B:
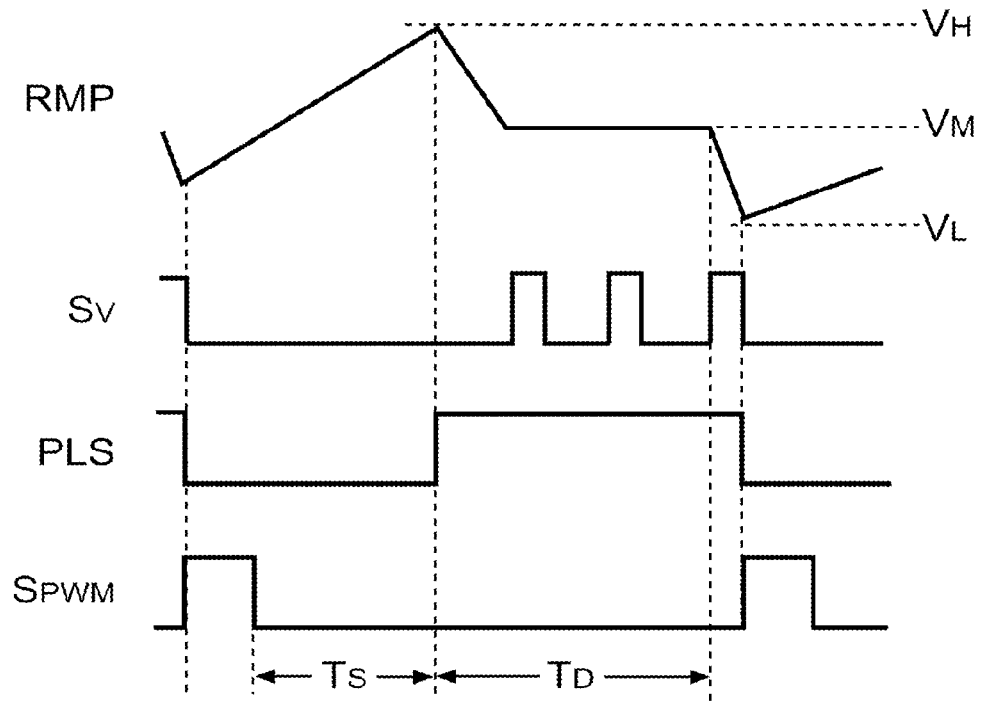
FIG. 10B shows key waveforms as the quasi-resonant power converter under light load condition.

FIG. 10B shows key waveforms as the quasi-resonant power converter is operated at quasi-resonant and extended valley switching under light load condition. The switching signal $S_{PWM}$ is, for example, enabled at the time point $P_3$ shown in FIG. 8.

Figure 11:
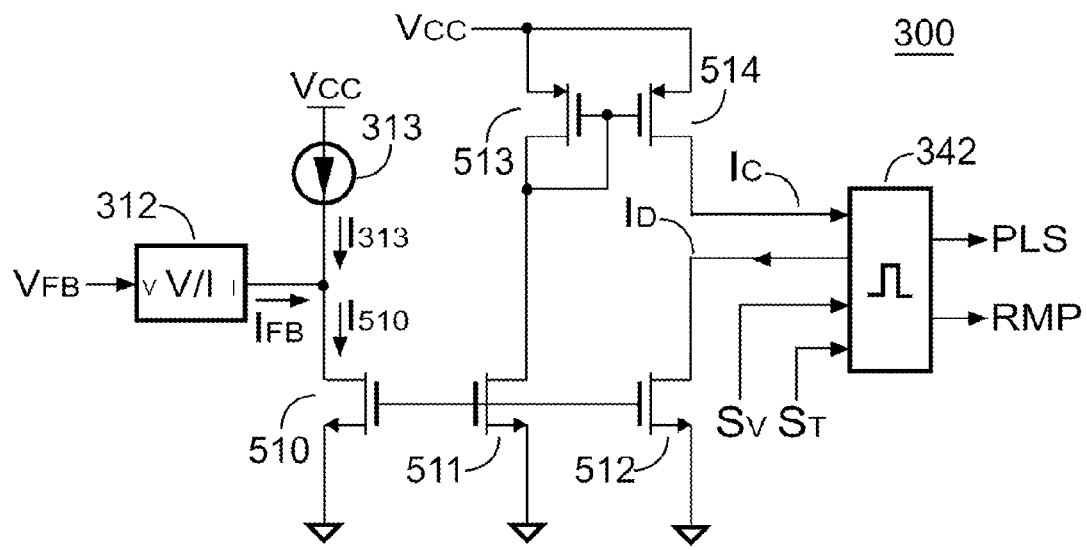
FIG. 11 shows another embodiment of the signal generation circuit of the controller according to the present invention.

FIG. 11 shows another embodiment of the signal generation circuit 300 of the controller 50 according to the present invention. A voltage-to-current converter 312 generates a current $I_{FB}$ in response to the feedback signal $V_{FB}$. The current source 313 generates a current $I_{313}$. The current $I_{313}$ associates with the current $I_{FB}$ to generate a current $I_{510}$. The current $I_{313}$ ensures a minimum current for the current $I_{510}$. The current $I_{510}$ therefore decreases in response to the decrement of the feedback signal $V_{FB}$. Transistors 510, 511, 512, 513 and 514 develop a current mirror circuit. The current $I_{510}$ is supplied to an input of the current mirror circuit. A first output and a second output of the current mirror respectively supplies a charge current $I_C$ to an oscillation circuit 342 and sinks a discharge current $I_D$ from the oscillation circuit 342. Both of the charge current $I_C$ and the discharge current $I_D$ decrease in response to the decrement of the feedback signal $V_{FB}$. The oscillation circuit 342 further receives the valley signal $S_V$ and the discharge-time signal $S_T$ for generating the pulse signal PLS and the ramp signal RMP.

Figure 12:
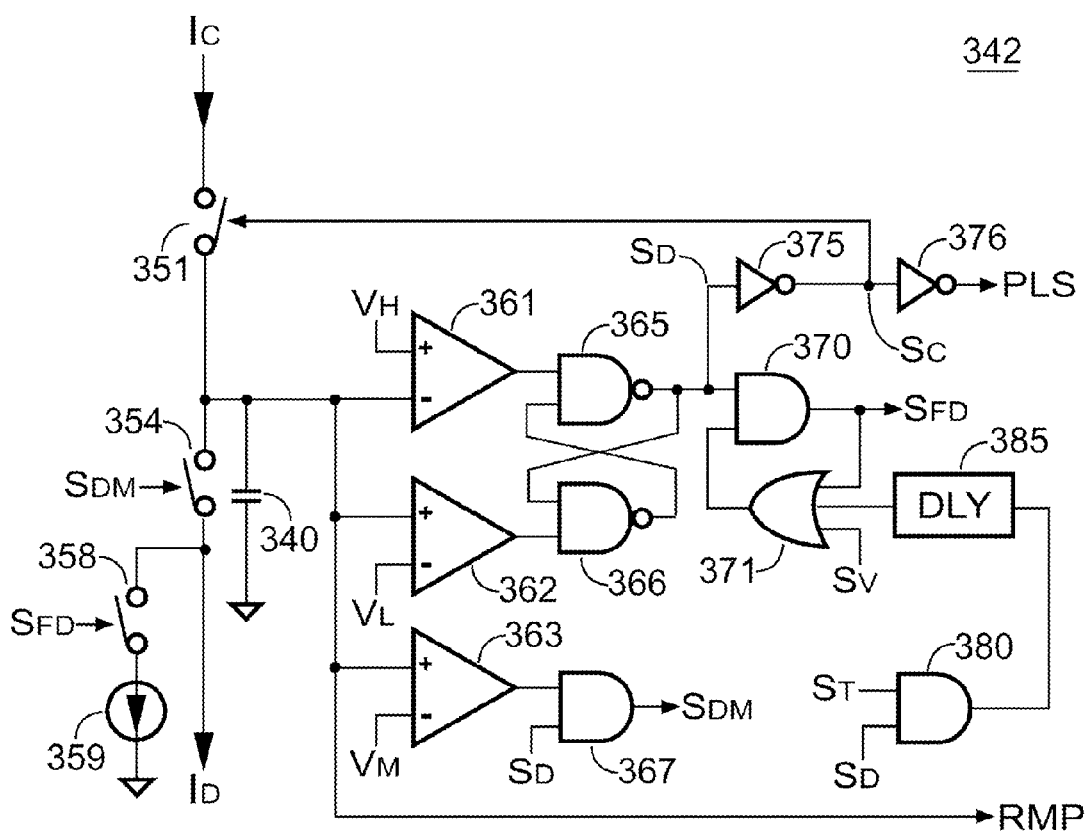
FIG. 12 shows an embodiment of an oscillation circuit of the signal generation circuit in FIG. 11 according to the present invention.

FIG. 12 shows an embodiment of the oscillation circuit 342 of the signal generation circuit 300 of FIG. 11 according to the present invention. The oscillation circuit 342 comprises a saw-tooth generator and a control circuit. The saw-tooth generator comprises a current source 359, a capacitor 340 and switches 351, 354, 358. A first terminal of the switch 351 is coupled to the first output of the current mirror circuit in FIG. 11 for receiving the charge current $I_C$. A second terminal of the switch 351 is connected to a first terminal of the switch 354. A second terminal of the switch 354 is coupled to the second output of the current mirror circuit in FIG. 11 for sourcing the discharge current $I_D$. The switch 358 and the current source 359 are connected in series between the second terminal of the switch 354 and the ground reference. The capacitor 340 is connected between the second terminal of the switch 351 and the ground reference. The charge current $I_C$ is utilized to charge the capacitor 340 via the switch 351. The discharge current $I_D$ is utilized to discharge the capacitor 340 via the switch 354. The switch 351 is controlled by a charge signal $S_C$. The switch 354 is controlled by a discharge signal $S_{SM}$. The switch 358 is controlled by a fast-discharge signal $S_{FD}$. The ramp signal RMP is thus generated across the capacitor 340. The control circuit comprises comparators 361, 362, 363, NAND gates 365, 366, AND gates 367, 370, 380, inverters 375, 376, an OR gate 371 and a time-delay circuit 385. The ramp signal RMP is supplied to a negative terminal of the comparator 361, a positive terminal of the comparator 362 and a positive terminal of the comparator 363. A positive terminal of the comparator 361 receives a threshold voltage $V_H$. A negative terminal of the comparator 362 receives a threshold voltage $V_L$. A negative terminal of the comparator 363 receives a threshold voltage $V_M$. The threshold voltage $V_H$ is greater than the threshold voltage $V_M$. The threshold voltage $V_M$ is greater than the threshold voltage $V_L$. NAND gates 365 and 366 form a latch circuit coupled to receive the output signals of the comparators 361 and 362. The latch circuit outputs a discharge signal $S_D$. The discharge signal $S_D$ determines the maximum frequency of the switching signal $S_{PWM}$. The discharge signal $S_D$ and an output signal of the comparator 363 are supplied to inputs of an AND gate 367 for generating the discharge signal $S_{DM}$. The inverter 375 receives the discharge signal $S_D$ to generate the charge signal $S_C$. The inverter 376 receives the charge signal $S_C$ to generate the pulse signal PLS. The pulse signal PLS is enabled during the discharge period of the capacitor 340. The discharge signal $S_D$ is further supplied to an input of the AND gate 370 to generate the fast-discharge signal $S_{FD}$. The fast-discharge signal $S_{FD}$ and the valley signal $S_V$ are supplied to inputs of the OR gate 371. An output of the OR gate 371 is connected to another input of the AND gate 370. Therefore, the valley signal $S_V$ will trigger the fast-discharge signal $S_{FD}$ once the discharge signal $S_D$ is enabled. The fast-discharge signal $S_{FD}$ can be disabled only when the discharge signal $S_D$ is disabled. Furthermore, the discharge-time signal $S_T$ and the discharge signal $S_D$ are supplied to inputs of the AND gate 380. An output of the AND gate 380 is coupled to another input of the OR gate 371 via the time-delay circuit 385. Therefore, while the discharge-time signal $S_T$ is enabled, enabling the discharge signal $S_D$ will initiate the fast-discharge signal $S_{FD}$ after a delay time even the valley signal $S_V$ is not available. The delay time is provided by the time-delay circuit 385.

Since the current of the current source 359 is much higher than that of the discharge current $I_D$, the capacitor 340 will be immediately discharged when the fast-discharge signal $S_{FD}$ is enabled. During the discharge period of the capacitor 340, the ramp signal RMP is held at the level of the threshold $V_M$ until the fast-discharge signal $S_{FD}$ is enabled. Once the ramp signal RMP is lower than the threshold voltage $V_L$, the discharge signal $S_D$ will be disabled. The valley signal $S_V$ is thus able to trigger the pulse signal PLS once the discharge signal $S_D$ is enabled. Therefore, the charge current $I_C$, the capacitance of the capacitor 340 and the threshold voltages $V_H$, $V_M$, $V_L$ determine the maximum frequency of the discharge signal $S_D$, and determine the maximum frequency of the switching signal $S_{PWM}$.

The invention provides embodiments of the controllers that are able to limit the maximum switching frequency and achieve valley switching over various load conditions. Therefore, the quasi-resonant power converter can achieve high efficiency over various load conditions.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A controller for a power converter, comprising:
    a PWM circuit, generating a switching signal coupled to switch a transformer of said power converter, wherein a feedback signal is coupled to said PWM circuit to disable said switching signal;
    a detection circuit, coupled to said transformer via a resistor for generating a valley signal in response to a detection signal obtained from said transformer;
    a signal generation circuit, coupled to receive said feedback signal and said valley signal for generating an enabling signal; and
    an oscillation circuit, generating a maximum frequency signal, wherein said maximum frequency signal associates with said enabling signal to generate a pulse signal, said pulse signal is coupled to enable said switching signal, said feedback signal is correlated to an output load of said power converter, and said maximum frequency of said pulse signal is limited.

2. The controller as claimed in claim 1, further comprising a burst circuit coupled to receive said feedback signal for generating a burst signal to disable said switching signal, wherein said burst circuit comprises a threshold with a hysteresis characteristic for generating said burst signal.

3. The controller as claimed in claim 1, wherein an off-time of said switching signal increases in response to a decrement of said feedback signal.

4. The controller as claimed in claim 1, wherein said detection circuit comprises:
    a detection terminal, coupled to said transformer to receive said detection signal;
    a voltage clamping circuit, clamping a minimum voltage at said detection terminal;
    a current detection circuit, generating a current signal in response to a current sourcing to said detection terminal; and
    a comparator, generating valley signal in response to said current signal, wherein said valley signal is generated only when said switching signal is disabled.

5. A method for controlling a quasi-resonant power converter, comprising:
    generating a switching signal coupled to switch a transformer of said quasi-resonant power converter;
    generating a reset signal in response to a feedback signal;
    generating a valley signal in response to a detection signal obtained from said transformer during an off-time of said switching signal;
    generating a maximum frequency signal;
    generating an enabling signal in response to said feedback signal and said valley signal; and
    generating a pulse signal in response to said enabling signal and said maximum frequency signal, wherein said reset signal is coupled to disable switching signal, said pulse signal is coupled to enable said switching signal, and said feedback signal is correlated to an output load of said quasi-resonant power converter.

6. The method as claimed in claim 5, wherein said valley signal is generated via a resistor coupled to said transformer.

7. The method as claimed in claim 5, further comprising:
    generating a burst signal in response to said feedback signal, wherein said burst signal is coupled to disable said switching signal, said burst signal is generated in response to said feedback signal and a threshold signal, and said threshold signal has a hysteresis characteristic for generating said burst signal.

8. The method as claimed in claim 5, wherein said off-time of said switching signal increases in response to a decrement of said feedback signal.

9. The method as claimed in claim 5, wherein a maximum frequency of said switching signal is limited.

10. A method for switching a power converter, comprising:
   generating a switching signal coupled to switch a transformer of said power converter;
   generating a reset signal in response to a feedback signal;
   generating a valley signal in response to a signal waveform of said transformer during an off-time of said switching signal; and
   generating a pulse signal in response to said feedback signal and said valley signal, wherein a maximum frequency of said pulse signal is limited, said reset signal is coupled to disable said switching signal, said pulse signal is coupled to enable said switching signal; and said feedback signal is correlated to an output load of said power converter.

11. The method as claimed in claim 10, further comprising:
   generating a maximum frequency signal to generate said pulse signal, wherein a frequency of said maximum frequency signal decreases in response to a decrement of said feedback signal.

12. The method as claimed in claim 10, wherein said valley signal is generated via a resistor coupled to said transformer.

13. The method as claimed in claim 10, further comprising:
   generating a burst signal in response to said feedback signal, wherein said burst signal is coupled to disable said switching signal, said burst signal is generated in response to said feedback signal and a threshold signal, and said threshold signal has a hysteresis characteristic for generating said burst signal.

14. The method as claimed in claim 10, wherein an off-time of said switching signal increases in response to a decrement of said feedback signal.

15. The method as claimed in claim 10, wherein a maximum frequency of said switching signal is limited.

* * * * *